United States Patent [19]

Schultz et al.

[11] Patent Number: 4,463,780

[45] Date of Patent: Aug. 7, 1984

[54] ELBOW COVER

[76] Inventors: Roland P. Schultz; William G. Schultz, both of 1109 Ridgecrest Cir., Costa Mesa, Calif. 92627

[21] Appl. No.: 371,196

[22] Filed: Apr. 23, 1982

[51] Int. Cl.³ ............................................. F16L 59/02
[52] U.S. Cl. .................................... 138/178; 138/156; 285/47
[58] Field of Search ............. 138/99, 103, 110, 128 L, 138/156, 178; 285/47

[56] References Cited

U.S. PATENT DOCUMENTS 4,093,683 6/1978 Harley ........................... 138/156 X

FOREIGN PATENT DOCUMENTS 52-35359 3/1977 Japan ..................................... 285/47

Primary Examiner—Stephen Marcus
Assistant Examiner—Mark Thronson
Attorney, Agent, or Firm—Robert E. Strauss

[57] ABSTRACT

There is disclosed an elbow cover formed of a flexible thin sheet having a bistable configuration with: (1) an open stacking shape having an interior concavity and exterior convexity formed with a substantially ellipsoidal central portion and opposite, laterally projecting, substantially parabolic hyperboloidal ears; and (2) a closed, stable configuration forming a tubular elbow shape with the ears folded inwardly, completing the tubular ends of the elbow shape. The elbow cover is characterized by an unstable configuration assumed by compression of the closed tubular shape between its opposite outside tubular edges whereby the elbow shape flexes and spreads open, laterally separating the ears in a position permitting a one-handed application of the cover to an insulated elbow joint of tubular conduits.

5 Claims, 8 Drawing Figures

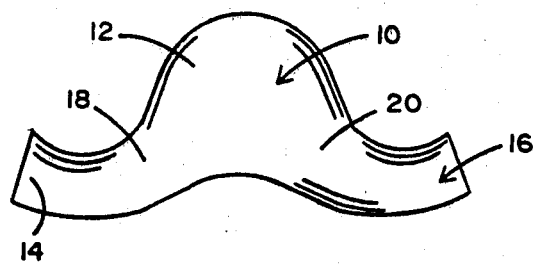
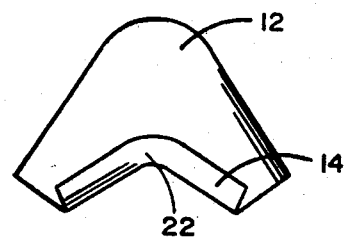
FIG. 1     FIG. 2
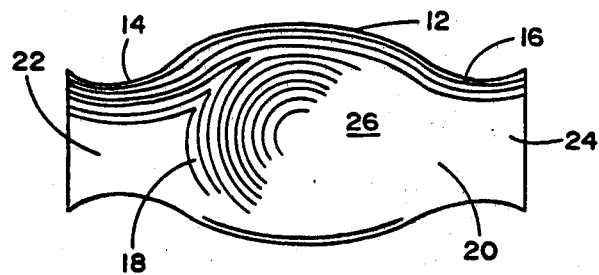
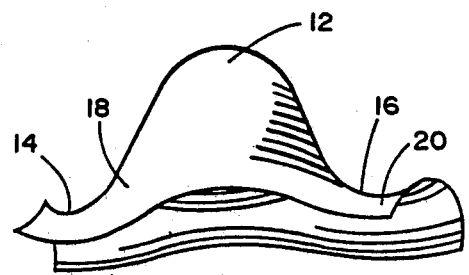
FIG. 3     FIG. 4
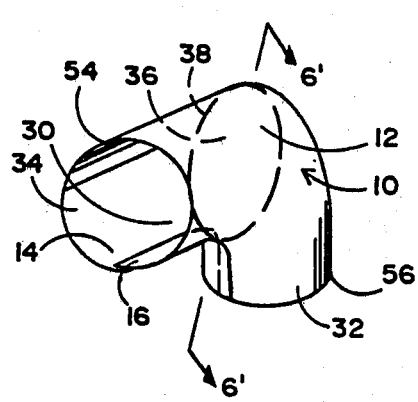
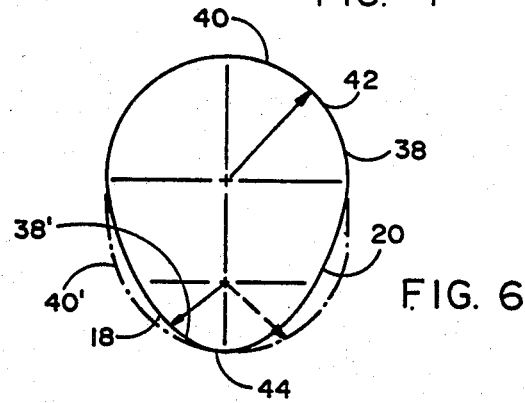
FIG. 5     FIG. 6

ELBOW COVER

BACKGROUND OF THE INVENTION

1. Field of Invention

This invention relates to an insulation cover and, in particular, to an insulation cover for a elbow joint of tubular conduits.

2. Brief Statement of the Prior Art

Insulation of tubular conduits is practiced by overlaying the surface of the conduits with a porous insulating material and restraining the material by enveloping it in a flexible sheet cover. Various approaches have been used to cover the insulation at the ubiquitous right angle elbows. One of the most recent approaches uses one-piece foldable elbow covers such as disclosed in U.S. Pat. No. 3,495,629. A practical difficulty experienced with elbow covers of this patent design was that these covers were unstable in the closed or elbow-shaped configuration and required that the applicator manually restrain the cover in its closed position while applying fastening means such as staples, tape, and the like to permanently restrain the elbow cover.

An improvement in the one-piece foldable elbow cover is that disclosed in U.S. Pat. No. 3,960,181 in which it is disclosed that the elbow cover can be stabilized in its final, elbow-shape and can be provided with a pair of laterally projecting ears that are foldable between the open and closed, stable configurations. The bistable character to this elbow cover is achieved by upsetting the flexing surfaces of the elbow cover with a pair of dimples or arcuate protrusions that snap over center as the ears are flexed between their bistable open and closed positions.

The bistable character of the elbow cover was a significant improvement in the art since it provided an elbow cover stable in an open or stacking configuration, suitable for storage and shipment and stable in the closed, final elbow shape so as to permit facile installation. The elbow cover of this patent design, nevertheless required the applicator to use both hands to reverse the laterally projecting ears and the arcuate protrusions or dimples can be cosmetically objectionable.

A recently issued patent, U.S. Pat. No. 4,139,026, also discloses a one-piece, foldable elbow cover which is stable in the open, stacking configuration and the closed, elbow configuration. This patent discloses that the surface arcuate protrusions can be smoothly blended into the surrounding surface of the cover and teaches that if the depths of these protrusions, as measured from an arcuate curve of the outside radius of the tubular section, is from 3% to 10% of such radius, then the cover is also stable in intermediate, partially open positions. The difficulty with this patent design is the stability of the intermediate configurations, i.e., the partially open configurations. This requires the two-handed application of the elbow cover to a right angle insulated joint. Frequently, such joints are encountered in locations having limited access where using both hands is extremely difficult. Also, the covers of this patented design can be applied to oversized diameter lines only with difficulty since the partial spreading of the cover sufficiently to envelope an oversized line can cause the cover to flip to its stable, partially open configuration and the cover must then be manually restrained while applying a permanent retention means such as tape or staples.

BRIEF STATEMENT OF THE INVENTION

This invention comprises a one-piece, foldable elbow cover formed of flexible sheet material which is bistable in an open, stacking configuration suitable for storage and handling and in a closed, elbow conforming configuration with an intermediate, unstable, partially open configuration formed by manually compressing the cover between its opposite outer tubular edges from which the cover resiliently flips into its closed right angle elbow configuration when released. This latter property significantly improves the versatility of such a cover since it permits the single-handed application of the cover to right angle, insulated joints of tubular conduits, greatly facilitating the application of the cover in limited access locations.

The elbow cover is formed with: (1) an open stacking configuration having an interior concavity and an exterior convexity formed by a substantially ellipsoidal central portion with opposite, laterally projecting and substantially parabolic hyperboloidal ears; and (2) a closed, tubular elbow shape wherein the ears are folded inwardly, completing the tubular ends of the elbow shape.

The unstable partially open configuration is assumed by the elbow upon compression of its closed, elbow-shaped configuration between the opposite, outside tubular edges. It has been found that the characteristic of a resilient snapping of the elbow cover from its unstable, compressed and partially opened configuration to its closed elbow shape can be achieved by imparting a slight asymmetry to the flexing surface of the elbow cover by decreasing the radius of curvature of the cover, when in its closed elbow-shaped configuration by an amount greater than about 12% of the radius of the tubular portion of the elbow cover.

BRIEF DESCRIPTION OF THE DRAWINGS

The invention will be described with reference to the drawings of which:

FIG. 1 is a side view of an elbow cover of the invention;

FIG. 2 is an end view of the cover of FIG. 1;

FIG. 3 is a view of the undersurface of the cover of FIG. 1;

FIG. 4 is a perspective view of the elbow cover of FIG. 1 showing its stable, open configuration;

FIG. 5 is a perspective view of the elbow cover of FIG. 1 in its stable, closed configuration;

FIG. 6 is a view along the diagonal plane of the elbow cover in its closed configuration;

DESCRIPTION OF THE PREFERRED EMBODIMENT

Figure 7:
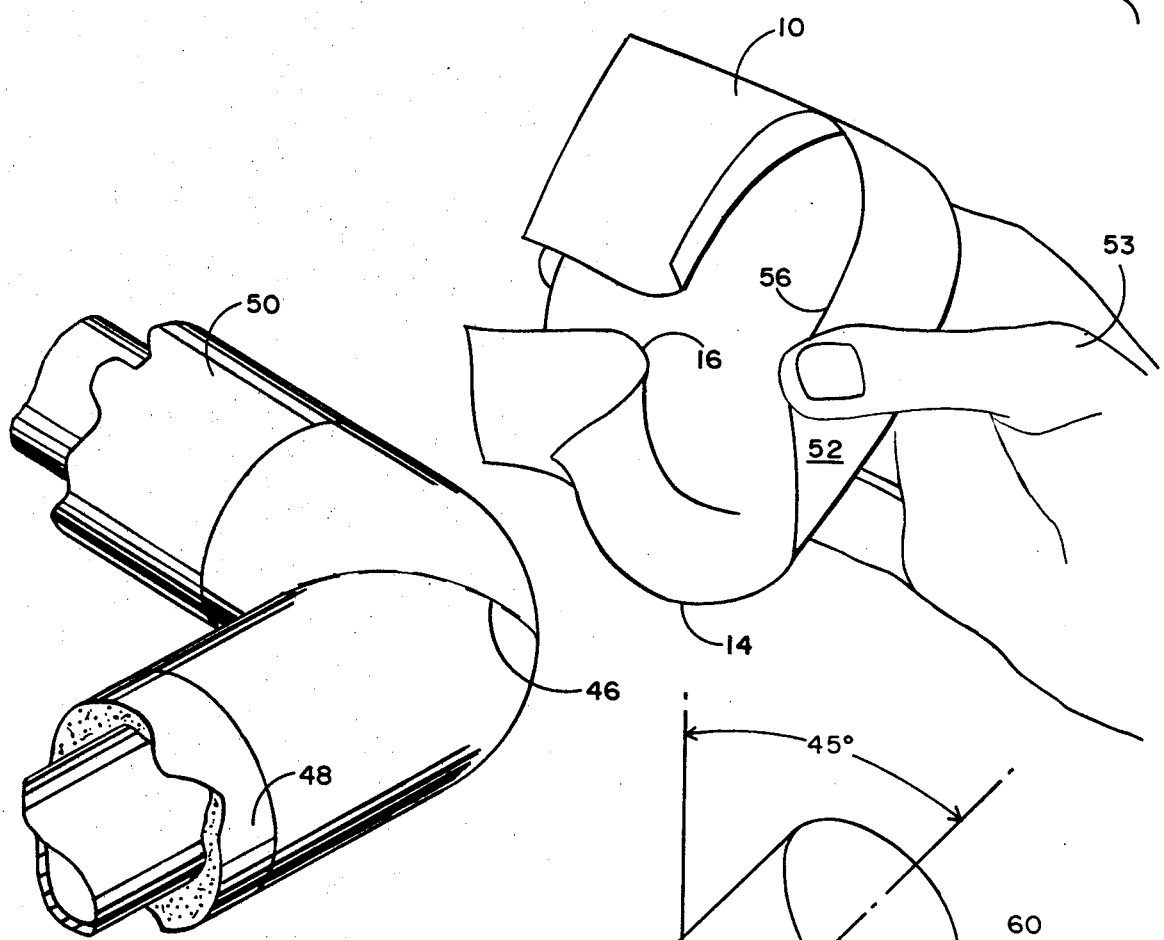
FIG. 7 illustrates the one-handed installation of the elbow cover by compression of the elbow into its unstable, partially opened configuration.

Referring now to FIG. 1, the elbow cover generally indicated at 10 is formed of a thin flexible sheet material that is molded into the configuration illustrated with a central or substantially ellipsoidal portion 12 and a pair of laterally projecting ears 14 and 16. The laterally projecting ears are formed with a flexing surface generally indicated at 18 and 20 that has a smooth radius of curvature of a generally parabolic configuration. The exterior of the cover in the open configuration is convex and the interior is concave.

The generally ellipsoidal shape of the central portion 12 is further illustrated in FIG. 2 where the central portion 12 can be seen to have approximately the same occluded angles between its side walls as in the side view of FIG. 1, thus generally assuming the contour of a surface of revolution.

The oppositely extending ears such as 14 have a hyperboloid undersurface generally shown as 22 in FIG. 2.

The interior concavity of the elbow cover is illustrated in FIG. 3 in which the laterally projecting ears 14 and 16 are observed to have a hyperboloid concavity 22 and 24 while the central portion 12 can be observed to have a generally ellipsoidal concavity 26. The laterally projecting ears 14 and 16 are joined with the central portion by the aforementioned flexing surfaces 18 and 20 which have curvatures to provide a smooth transition between the laterally projecting ears and the central portion.

Referring now to FIG. 4, the stable open configuration of the elbow cover can be seen in greater detail. As there illustrated, the central portion 12 has the general configuration of a partial ellipsoid and the ears 14 and 16 have a definite saddle configuration, typical of a partial parabolic hyperboloid with the ears joined to the partial ellipsoidal central section 12 through the flexing surfaces 20 and 18 which are basically partially parabolic.

Referring now to FIG. 5, the elbow cover 10 is illustrated in its stable, closed tubular right angle elbow shape. As there illustrated, the ears 14 and 16 have been folded inwardly, reversing their position from that shown in FIG. 4 and, in this shape, overlap in area 30. This forms a right angle having tubular ends 32 and 34 which will envelope the insulated tubular conduit joined at the elbow. In this configuration, the partially ellipsoidal central section 12 rests over the sharp angle of the right angle elbow of the assembly. There is also shown, in FIG. 5, in phantom lines a line scribed on the inside of the surface by an imaginery diagonal plane 36. This line forms an asymmetric ellipse 38 in the manner described in more detail with reference to FIG. 6.

Referring now to FIG. 6, the asymmetric ellipse 38 is illustrated and as illustrated, the outside end of this ellipse formed by the diagonal plane of the elbow cover conforms closely to an elliptical shape having a smooth curvature along the arcuate portion 42.

The opposite end, however, of the ellipse is of a curvature having a lesser radius along the solid line 38' which is within the phantom line throughout the transition of the diagonal through the flexing surfaces 18 and 20. This reduction in curvature is at least 12% and is preferably in an amount from 12% to about 20%.

The elbow cover of the invention can be readily applied to a covered or insulated right angle joint between conduits in the manner shown in FIG. 7. As shown in FIG. 7, an insulated right angle elbow 46 is shown joined between insulated tubular conduits 48 and 50. The elbow cover 10 is applied to this insulated right angle elbow joint by a workman who grasps the elbow cover 10 in one hand 53 in the illustrated manner. This is performed by compressing the elbow cover in its right angle shape of FIG. 5 by placing one's fingers at the outer tubular edges 54 and 56, shown in FIG. 5. The installer then compresses the right angle elbow shape between his fingers which resiliently flexes the elbow cover into the partially open configuration shown in FIG. 7. In this configuration, the ears 14 and 16 resiliently flex, through the flexing areas 18 and 20 into the partially open configuration, allowing the applicator to insert the partially open elbow cover over the insulated right angle joint with a single-handed operation. The operator then releases the elbow cover and it will resiliently snap into the closed, elbow shape of FIG. 5 without any additional intervention by the applicator. Thereafter, the overlapping ears 14 and 16 are permanently secured by the application of adhesive, tape, staples, and the like.

Figure 8:
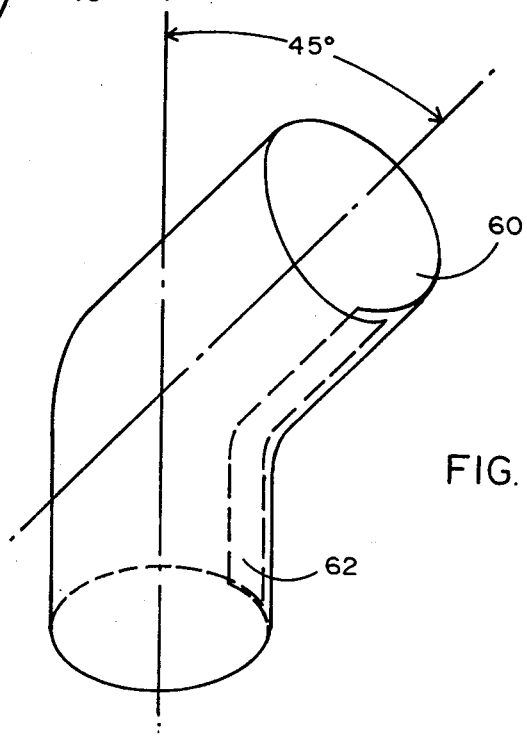
FIG. 8 illustrates a 45 degree elbow cover of the invention.

The invention has been described with reference to a right angle elbow cover which constitutes the majority of its applications. FIG. 8, however illustrates the cover applied to a 45 degree elbow wherein the legs 60 and 62 intersect at a 45 degree angle. Other configurations can also be used from acute to obtuse intersecting angles.

The invention has been described with reference to the illustrated and presently preferred embodiment. It is not intended that the invention be unduly limited by this disclosure of preferred embodiments. Instead, it is intended that the invention be defined by the means, and the obvious equivalents, set forth in the following claims.

What is claimed is:

1. An elbow cover formed of a flexible thin sheet and having the following two stable configurations:
   (a) an open stacking configuration with an interior concavity and an exterior convexity formed by a substantially ellipsoidal central portion and opposite, laterally projecting ears having substantially parabolic hyperboloidal surfaces joined to said central portion by partially parabolic flexing surfaces; and
   (b) a closed configuration forming a tubular elbow shape with opposite tubular ends and an asymmetric elliptical diagonal cross section through said flexing surfaces when said ears are folded inwardly to complete the tubular ends of said elbow shape; and having an unstable configuration assummed by compression of the closed configuration between its opposite outside tubular edges to cause said elbow shape to flex and spread open and laterally separate said ears, whereby said cover resiliently snaps into said tubular elbow shape when released from said compression, thereby permitting said cover to be compressed partially open, placed over a tubular angle joint and released to snap closed in a single-handed operation.

2. The elbow cover of claim 1 wherein said parabolic hyperboloidal surfaces contiguous to said ellipsoidal central portion function as flexing areas to permit reversal of the ears from outward to inward lateral projections.

3. The elbow cover of claim 2 wherein the undersurface of said hyperboloidal surface of said laterally projecting ears provides asymmetry to the diagonal cross-section of the closed configuration of said cover.

4. The elbow cover of claim 3 wherein the magnitude of said asymmetry of said diagonal cross-section is sufficient to reduce the radius of curvature through said flexing area by an amount greater than about 12%.

5. The elbow cover of claim 3 wherein the magnitude of said asymmetry of said diagonal cross-section is sufficient to reduce the radius of curvature through said flexing area by an amount from 12% to about 20%.

* * * * *